(12) United States Patent
Beck et al.

(10) Patent No.: US 10,619,768 B2
(45) Date of Patent: Apr. 14, 2020

(54) FLEXIBLE HOSE

(71) Applicant: ULTRA ELECTRONICS LIMITED, Middlesex (GB)

(72) Inventors: Robert Beck, Middlesex (GB); Ian Cooper, Middlesex (GB); Simon Harding, Middlesex (GB)

(73) Assignee: ULTRA ELECTRONICS LIMITED, Middlesex (GB)

( * ) Notice: Subject to any disclaimer, the term of this patent is extended or adjusted under 35 U.S.C. 154(b) by 210 days.

(21) Appl. No.: 15/608,726

(22) Filed: May 30, 2017

(65) Prior Publication Data

US 2017/0350542 A1 Dec. 7, 2017

(30) Foreign Application Priority Data

Jun. 1, 2016 (GB) .................................. 1609590.3

(51) Int. Cl.
*F16L 11/08* (2006.01)
*B32B 7/10* (2006.01)
*B32B 5/02* (2006.01)
*B32B 7/08* (2019.01)
*B32B 15/085* (2006.01)
(Continued)

(52) U.S. Cl.
CPC .............. *F16L 11/088* (2013.01); *B32B 1/08* (2013.01); *B32B 5/02* (2013.01); *B32B 5/028* (2013.01); *B32B 7/08* (2013.01); *B32B 7/10* (2013.01); *B32B 15/085* (2013.01); *B32B 15/14* (2013.01); *B32B 15/18* (2013.01); *B32B 27/12* (2013.01); *B32B 27/322* (2013.01); *B32B 27/34* (2013.01); *F16L 11/125* (2013.01); *B32B 2262/0269* (2013.01); *B32B 2307/306* (2013.01); *B32B 2307/308* (2013.01); *B32B 2307/7242* (2013.01); *B32B 2307/7265* (2013.01); *B32B 2307/736* (2013.01); *B32B 2597/00* (2013.01); *B32B 2605/00* (2013.01); *B32B 2605/18* (2013.01)

(58) Field of Classification Search
CPC ......... F16L 11/088; F16L 11/125; B32B 1/08; B32B 5/02; B32B 5/028; B32B 7/08; B32B 7/10; B32B 15/085; B32B 15/14; B32B 15/18; B32B 27/12; B32B 27/322; B32B 27/34
USPC ........................................ 138/125, 129, 134
See application file for complete search history.

(56) References Cited

U.S. PATENT DOCUMENTS 4,200,126 A * 4/1980 Fish ........................... F16L 9/12
138/127
4,492,089 A * 1/1985 Rohner .................... F16L 53/00
138/111
(Continued)

FOREIGN PATENT DOCUMENTS

EP 0918182 A1 5/1999
GB 1353760 A 5/1974
(Continued)

OTHER PUBLICATIONS

Search Report dated Dec. 1, 2016 for GB1609590.3.

*Primary Examiner* — Craig M Schneider
*Assistant Examiner* — David R Deal
(74) *Attorney, Agent, or Firm* — One LLP; Jonathan Jaech

(57) ABSTRACT

A flexible hose comprising: a flexible conduit for carrying a pressurized fluid; a flexible inner support for supporting the conduit; and a compression layer surrounding the flexible conduit.

9 Claims, 2 Drawing Sheets

(51) Int. Cl.
*B32B 27/32* (2006.01)
*B32B 27/12* (2006.01)
*B32B 27/34* (2006.01)
*B32B 15/14* (2006.01)
*B32B 15/18* (2006.01)
*B32B 1/08* (2006.01)
*F16L 11/12* (2006.01)

(56) References Cited

U.S. PATENT DOCUMENTS

| | | | | |
|---|---|---|---|---|
| 4,950,436 | A | | 8/1990 | Kitami et al. |
| 5,062,456 | A | * | 11/1991 | Cooke ................... F16L 11/088 138/125 |
| 5,143,122 | A | * | 9/1992 | Adkins ................... B29C 63/42 138/103 |
| 5,341,849 | A | * | 8/1994 | Mang ................... F16L 11/081 138/133 |
| 5,647,400 | A | * | 7/1997 | Jani ................... F16L 11/081 138/126 |
| 6,315,715 | B1 | * | 11/2001 | Taylor ................... A61B 1/018 138/122 |
| 6,742,545 | B2 | * | 6/2004 | Fisher ................... F16L 11/081 138/125 |
| 2003/0075228 | A1 | * | 4/2003 | Tippett ................... B32B 1/08 138/125 |
| 2004/0024392 | A1 | * | 2/2004 | Lewis ................... A61B 18/02 606/22 |
| 2006/0011249 | A1 | | 1/2006 | Arima et al. |
| 2007/0221281 | A1 | | 9/2007 | Takagi |
| 2010/0300570 | A1 | * | 12/2010 | Witz ................... F16L 9/12 138/137 |
| 2011/0240164 | A1 | * | 10/2011 | Hudson ................... F16L 11/088 138/129 |
| 2011/0284116 | A1 | * | 11/2011 | Donnelly ................... B29C 53/582 138/129 |
| 2013/0192676 | A1 | * | 8/2013 | Gaw ................... B32B 5/024 137/1 |
| 2015/0004408 | A1 | * | 1/2015 | Yamasaki ................... C09J 7/35 428/355 EN |
| 2015/0247032 | A1 | | 9/2015 | Takatani et al. |

FOREIGN PATENT DOCUMENTS

GB      2502772 A      12/2013
KR    100756748 B1       9/2007

* cited by examiner

FLEXIBLE HOSE

CROSS-REFERENCE TO RELATED APPLICATION

This application claims priority pursuant to 35 U.S.C. § 119(b) to Great Britain application Serial No. GB1609590.3 filed Jun. 1, 2016, which is hereby incorporated by reference, in its entirety.

TECHNICAL FIELD

The present application relates to a flexible hose.

BACKGROUND TO THE INVENTION

Many applications in the aerospace industry require fluids such as compressed air, brake fluid, coolant and the like to be transported around an aircraft, vehicle or other structure, and a wide variety of hoses are available for these purposes. Known hoses function adequately in normal operating conditions, but can fail or deteriorate when used in extreme conditions such as at high altitude or in extremes of temperature. Failure or deterioration of these hoses can lead, at best, to reduced performance, and at worst to catastrophic failure of critical systems.

One area where high performance hoses are required to operate in extreme conditions is in weapons and countermeasures systems for military aircraft. These systems require extremely high pressure (around 5000 psi) dry air to be delivered reliably at extreme altitudes and temperatures (e.g. temperatures in the range −70° C. to +80° C.), while remaining flexible in dynamic applications. These hoses are subject to fatigue caused by a combination of forces applied by the internal pressure and external inertial loads and flexural loads. As will be appreciated, in such systems, any deterioration or failure of the hose delivering the dry air could have serious adverse consequences.

Accordingly, a need exists for a high performance hose that is able to carry fluids at extremely high pressure and to operate reliably in hostile environments and at extremes of temperature.

SUMMARY OF INVENTION

According to a first aspect of the present invention there is provided a flexible hose comprising: a flexible conduit for carrying a pressurized fluid; a flexible inner support for supporting the conduit; and a compression layer surrounding the flexible conduit.

The combination of the flexible conduit, flexible inner support and compression layer gives rise to a water and air impermeable, strong, durable and robust hose that nevertheless remains flexible, and flexes in a predictable and repeatable manner, and can be used for demanding applications in hostile environments and extremes of temperature.

The flexible inner support may be provided, on an outer surface thereof, with a coil or thread formation, and the flexible conduit may be provided, on an inner surface thereof, with a complementary coil or thread formation which, when the flexible hose is assembled, engages with the coil or thread formation of the inner support to maintain the conduit in position relative to the inner support.

The flexible hose may further comprise an outer sleeve.

The flexible inner support may comprise a flexible and chemically stable polymer material.

The flexible and chemically stable polymer material may comprise polytetrafluoroethylene (PTFE), for example.

The conduit may comprise stainless steel tubing.

The compression layer may comprises a sleeve of braided material.

The braided material may comprise Nomex®, for example.

The outer sleeve may be of a polymer material.

The outer sleeve may be of a heat-shrink material.

For example, the outer sleeve may be of Raychem DR-25™ heat-shrinkable tubing.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
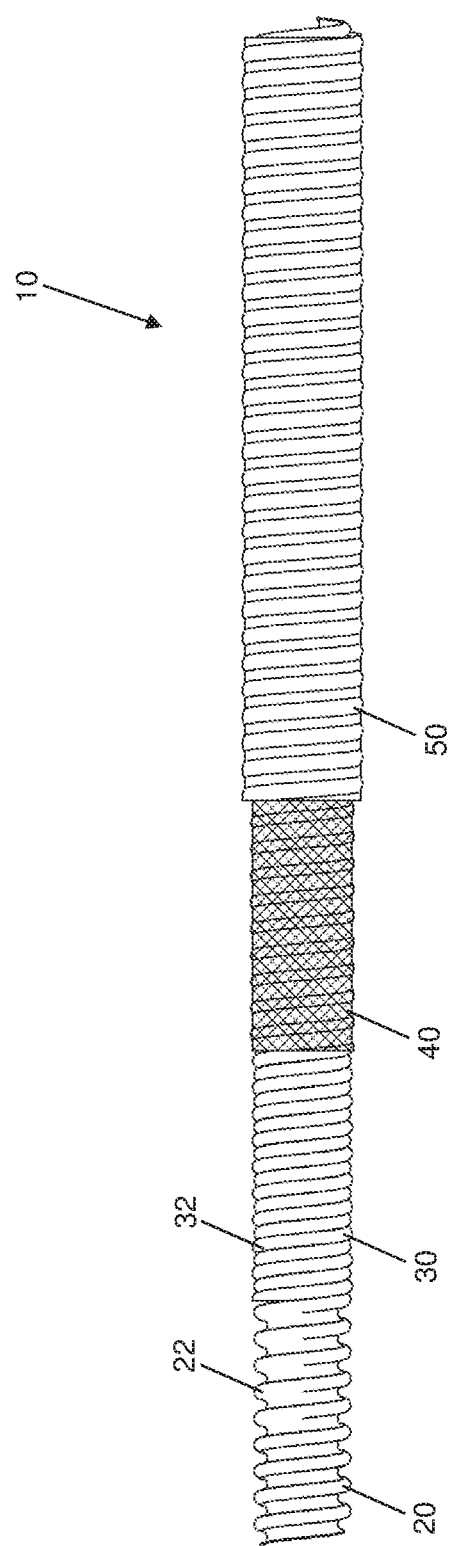
FIG. 1 is a schematic cutaway view from one side of a section of flexible hose.
Figure 2:
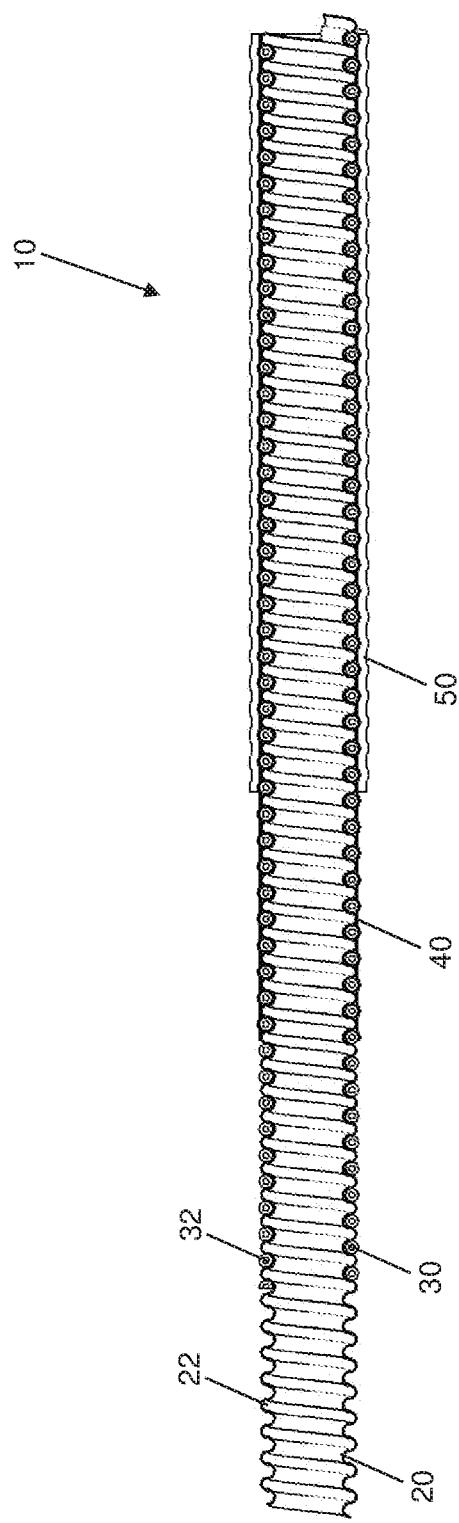
FIG. 2 is a schematic cutaway cross-sectional view of the section of flexible hose shown in FIG. 1.

Referring first to FIG. 1, a section of hose is shown generally at 10. The hose 10 comprises a flexible, hollow, inner support 20 of a water and air impermeable material. In the illustrated example an outer surface of the inner support 20 is formed with a continuous helical coil or thread formation 22, though it is to be appreciated that the inner support 20 may be formed without this helical coil or thread formation. The inner support is made of a chemically stable polymer material, such as polytetrafluoroethylene (PTFE), or a similar chemically stable polymer.

The inner support 20 is received within and acts as a support for a conduit 30 which carries high-pressure air through the hose 10. The conduit 30 is made from a metal such as stainless steel, and is formed from a flexible tube which, in the illustrated example, has an inner surface that is formed with a continuous helical coil or thread formation 32 that is complementary to the helical coil or thread formation 22 of the inner support 20. It is to be appreciated, however, that the conduit 30 may be formed without this helical coil or thread formation. The conduit 30 may be formed, for example, of 1/16" helically wound stainless steel tubing. Stainless steel is preferred for the conduit 30, as it is able to function in the required temperature range (−70° C. to +80° C.) and has the required air impermeability properties.

When the hose 10 is assembled the coil or thread formation 32 of the inner surface of the conduit 30 is threaded onto or interleaved with the coil or thread formation 22 of the outer surface of the inner support 20. This engagement of the coil or thread formation 32 of the conduit 30 with the coil or thread formation 22 of the inner support 20 helps to maintain the conduit 30 in position with respect to the inner support 20. However, where the coil or thread formations 22, 32 are not provided there is minimal risk of displacement of the conduit 30 with respect to the inner support 20, as other components of the hose 10 provide a compressive force which helps to maintain the conduit 30 in position, as will be explained in more detail below.

The inner support 20 provides a flexible support for the conduit 30. The inner support 20 helps to prevent the conduit 30 from shifting during flexing of the hose and, and from collapsing at high bend radii. This arrangement of the conduit 30 being supported by the inner support 20 allows the conduit 30 to flex in a predictable and repeatable way, and helps to distribute stress in the hose 10, thereby reducing fatigue and increasing durability, thus leading to improved dynamic fatigue performance.

Surrounding the conduit 30 is a compression layer 40, which applies a compressive force to the conduit 30, which helps to maintain the conduit 30 in position relative to the inner support 20. This is particularly useful where the inner support 20 and the conduit 30 are provided without the complementary coil or thread formations 22, 32. The compression layer 40 also affords a degree of protection for the conduit 30 and the inner support 20 against mechanical abrasion and extremes of heat and cold. The compression layer 40 may be formed as a braided sleeve. A particularly suitable material for the braided sleeve is Nomex®, manufactured by DuPont, as this material has been found to be lightweight, flexible, durable and water repellent. The braided structure of the compression layer 40 facilitates manufacture of the hose 10, as the sleeve can expand to fit over the conduit 30. Moreover, the braided structure does not impede bending and flexing of the inner support 20 and the conduit 30.

An outer sleeve 50 of a polymer material may be provided, surrounding the compression layer 40. The outer sleeve 50 provides a further layer of abrasion and fluid resistance without impeding the flexibility of the hose 10. The sleeve 50 may be provided, for example, as a tube of heat-shrinkable material into which the assembly of the inner support 20, conduit 30 and compression layer 40 can be placed, with the sleeve then being heated to shrink to form the outer sleeve 50. A particularly suitable material for the outer sleeve is Raychem DR-25™.

In some embodiments the compression layer 40 and the outer sleeve 50 may be provided as a single layer.

The hose 10 may be provided at its ends with pneumatic hose connectors of any suitable type, to facilitate connection of the hose 10 to other components in a high pressure compressed air system.

The combination of the inner support 20, conduit 30, compression layer 40 and outer sleeve 50 gives rise to a high-performance, water and air impermeable, strong, durable and robust hose 10 with excellent dynamic fatigue performance that nevertheless remains flexible (and flexes in a repeatable and predictable manner), and can be used for demanding applications in hostile environments and extremes of temperature. For example, the hose 10 is particular suited to aerospace applications where extremely high pressure dry air (at around 5000 psi) is required.

The invention claimed is:

1. A flexible hose comprising:
   a flexible conduit for carrying a pressurized fluid;
   a flexible inner support for supporting the conduit; and
   a compression layer surrounding the flexible conduit, wherein the flexible conduit is wrapped helically around the flexible inner support, wherein the flexible inner support is provided on an outer surface thereof with a coil or thread formation, and wherein the flexible conduit is provided on an inner surface thereof with a complementary coil or thread formation, which when the flexible hose is assembled engages with the coil or thread formation of the flexible inner support to maintain the conduit in position relative to the inner support.

2. A flexible hose according to claim 1 further comprising an outer sleeve.

3. A flexible hose according to claim 2 wherein the outer sleeve is of a polymer material.

4. A flexible hose according to claim 3 wherein the outer sleeve is of a heat-shrink material.

5. A flexible hose according to claim 1 wherein the flexible inner support comprises a flexible and chemically stable polymer material.

6. A flexible hose according to claim 5 wherein the flexible polymer material comprises polytetrafluoroethylene (PTFE).

7. A flexible hose according to claim 1 wherein the conduit comprises stainless steel tubing.

8. A flexible hose according to claim 1 wherein the compression layer comprises a sleeve of braided material.

9. A flexible hose according to claim 8 wherein the braided material comprises a meta-aramid polymer.

* * * * *